(12) United States Patent
Hachtmann et al.

(10) Patent No.: US 9,972,814 B2
(45) Date of Patent: May 15, 2018

(54) EMBEDDED OPTICS IN MODULAR ASSEMBLIES

(71) Applicant: Tesla Motors, Inc., Palo Alto, CA (US)

(72) Inventors: Brian Dean Hachtmann, San Martin, CA (US); Mark Riegel, Los Gatos, CA (US); David Elias Hegeman, San Jose, CA (US); William Christopher Bishop, San Francisco, CA (US); William Vucich Beecher, San Francisco, CA (US)

(73) Assignee: TESLA, INC., Palo Alto, CA (US)

( * ) Notice: Subject to any disclaimer, the term of this patent is extended or adjusted under 35 U.S.C. 154(b) by 0 days. days.

(21) Appl. No.: 15/224,074

(22) Filed: Jul. 29, 2016

(65) Prior Publication Data
US 2016/0336565 A1 Nov. 17, 2016

Related U.S. Application Data

(62) Division of application No. 13/445,866, filed on Apr. 12, 2012, now Pat. No. 9,403,296.

(51) Int. Cl.
*H01M 2/10* (2006.01)
*B29C 65/00* (2006.01)
(Continued)

(52) U.S. Cl.
CPC ....... *H01M 2/1077* (2013.01); *B29C 35/0894* (2013.01); *B29C 65/4845* (2013.01);
(Continued)

(58) Field of Classification Search
CPC .............. B29C 65/4845; B29C 66/301; B29C 66/5324; H01M 2/1077; H01M 2/105
See application file for complete search history.

(56) References Cited

U.S. PATENT DOCUMENTS

| 5,057,348 A * | 10/1991 | Drain ...................... B29C 35/02 174/521 |
| 2001/0015254 A1* | 8/2001 | Albertson ........... B29C 65/1406 156/275.1 |

(Continued)

FOREIGN PATENT DOCUMENTS

| CN | 102190968 A | 9/2011 |
| JP | 2000306563 A | 11/2000 |

(Continued)

OTHER PUBLICATIONS

State Intellectual Property Office; Office Action and Search Report; CN Application No. 201310336455.6; dated Mar. 2, 2017; 9 pgs.

*Primary Examiner* — Michael N Orlando
*Assistant Examiner* — Cynthia L Schaller
(74) *Attorney, Agent, or Firm* — Garlick & Markison; Bruce E. Garlick

(57) ABSTRACT

An enhanced multi object potting fixture for exposure to a curing modality that sets an adhesive includes a fixture housing supporting a plurality of objects, the fixture housing having a wall defining a plurality of bonding wells with each the bonding well receiving a first portion of one of the objects, each the bonding well including an aperture in the wall proximate the first portion wherein each bonding well includes a target zone for selective cure of the adhesive to inhibit the adhesive from exiting the aperture; and a fixture enhancement structure integrated into the wall concentrating the curing modality in each the target zone.

12 Claims, 4 Drawing Sheets

(51) Int. Cl.
    *B29C 65/48*     (2006.01)
    *B29C 35/08*     (2006.01)
    *B32B 3/26*     (2006.01)
    *B29L 31/34*     (2006.01)

(52) U.S. Cl.
    CPC ........ *B29C 66/301* (2013.01); *B29C 66/5324* (2013.01); *B29C 66/73343* (2013.01); *H01M 2/105* (2013.01); *B29C 2035/0827* (2013.01); *B29L 2031/3468* (2013.01); *B32B 3/26* (2013.01); *H01M 2/10* (2013.01); *H01M 2220/20* (2013.01)

(56) References Cited

U.S. PATENT DOCUMENTS

| | | |
|---|---|---|
| 2009/0023060 A1 | 1/2009 | Villanueva et al. |
| 2010/0136413 A1 | 6/2010 | Hermann et al. |
| 2011/0165446 A1 | 7/2011 | Hermann |

FOREIGN PATENT DOCUMENTS

| | | |
|---|---|---|
| JP | 2009272048 A | 11/2000 |
| WO | 2009012036 A1 | 1/2009 |

\* cited by examiner

EMBEDDED OPTICS IN MODULAR ASSEMBLIES

CROSS REFERENCE TO RELATED APPLICATIONS

The present U.S. Utility Patent Application claims priority pursuant to 35 U.S.C. § 121 as a divisional of U.S. Utility application Ser. No. 13/445,866, entitled "EMBEDDED OPTICS IN MODULAR ASSEMBLIES", filed Apr. 12, 2012, issuing as U.S. Pat. No. 9,403,296 on Aug. 2, 2016, which is hereby incorporated herein by reference in its entirety and made part of the present U.S. Utility Patent Application for all purposes.

This application is related to U.S. Pat. No. 8,057,630 entitled "SELECTIVE CURE OF ADHESIVE IN MODULAR ASSEMBLIES" issued Nov. 15, 2011 and U.S. application Ser. No. 13/244,665 entitled "SELECTIVE CURE OF ADHESIVE IN MODULAR ASSEMBLIES" filed Sep. 25, 2011, now U.S. Pat. No. 8,322,393, issued Dec. 4, 2012, the contents of these references expressly incorporated in their entireties for all purposes by reference thereto.

BACKGROUND OF THE INVENTION

The present invention relates generally to module construction for assemblies having several-to-many elements, and more specifically, but not exclusively, to optical systems and methods for tuning cure profiles of selectively curable adhesives, most particularly for battery module assembly construction using ultraviolet radiation.

As noted in the incorporated references, it is common to produce module assemblies having elements secured together into an integrated monolithic structure. One method for securing the elements together uses an adhesive that bonds the elements to one or more fixtures. These fixtures typically include many openings that may be used to provide access to the elements, the inside of the assembly, or for other use. To inhibit adhesive from escaping from these openings during manufacture, a solution was provided that uses selectably curable adhesives. For example, the references use selective exposure to ultraviolet (UV) reactive adhesives to selectively gel adhesive at critical locations in the module assembly. This limits adhesive from exiting the assembly or otherwise flowing to undesirable locations during manufacture.

While the solution performs exceptionally well, there are scenarios where the process may be improved. For example, depending upon details of the curing modality and the specifics of the module assembly, there are instances where the curing modality is distorted and does not always produce an optimal cure profile. Distortions in the curing modality produce less than an optimum curing pattern for the adhesive, which can lead to leakage and waste. Further, application of adhesive in undesired areas necessitates additional efforts at remediation.

What is needed is a method and apparatus for reducing distortions in optimum curing patterns to improve selective cure and to decrease costs (e.g., expense, mass, cure time, and/or remediation) associated with use of adhesives when assembling modularized components.

BRIEF SUMMARY OF THE INVENTION

Disclosed are methods and systems for decreasing costs (expense, mass, cure time, and/or remediation) associated with use of adhesives when assembling modularized components, particularly for assemblies having many elements such as for example battery modules used in electric vehicles. The methods and systems enable use of selectively curable adhesives (e.g., UV reactive adhesives and the like) for assembling such modularized components.

The following summary of the invention is provided to facilitate an understanding of some of technical features related to optically enhanced potting fixtures, and is not intended to be a full description of the present invention. A full appreciation of the various aspects of the invention can be gained by taking the entire specification, claims, drawings, and abstract as a whole. The present invention is applicable to other curing modalities besides UV radiation fields and to other systems in addition to multiple battery cell fixtures.

An enhanced multi object potting fixture for exposure to a curing modality that sets an adhesive includes a fixture housing supporting a plurality of objects, the fixture housing having a wall defining a plurality of bonding wells with each the bonding well receiving a first portion of one of the objects, each the bonding well including an aperture in the wall proximate the first portion wherein each bonding well includes a target zone for selective cure of the adhesive to inhibit the adhesive from exiting the aperture; and a fixture enhancement structure integrated into the wall concentrating the curing modality in each the target zone.

An enhanced bonding method includes (a) dispensing a high-wettability adhesive into a module fixture populated with a plurality of elements wherein the module fixture provides a plurality of bonding wells with each bonding well accepting a first portion of one or more of the elements with the module fixture including one more apertures communicated with one or more of the bonding wells, the adhesive being selectively curable upon application of a curing modality; (b) applying the curing modality generally uniformly to the module fixture; and (c) concentrating the generally uniformly applied curing modality into a plurality of target zones corresponding to the plurality of bonding wells using fixture enhancement structures integrated into the module fixture.

Assemblies, such as for example battery modules, composed of a large number of elements (e.g., cells) on the order of tens to hundreds to thousands or more elements, implementing preferred embodiments of the present invention preferably have a method of mechanical integration that is low cost in terms of expense, mass, and process time. The use of appropriate high-wettability adhesives permits a stiff, robust, electrically insulating mechanical connection to the battery module fixture. The high packing density of cells within a battery module limits the room available for dispensing adhesive evenly throughout a battery module, however the high-wettability adhesive is better suited for even distribution, particularly when the module fixture is adapted with ramps, wicking channels, and guiding surfaces and the like to direct dispensing adhesive into all populated bonding wells. Features in the module fixture that allow electrical interconnects on both ends of each cell may provide potential leak pathways for the adhesive during dispensation.

Curing modalities such as UV radiation are applied to adhesive exiting from the apertures to seal the module fixture while allowing the adhesive to continue to fill the bonding wells and wet the bonding surfaces around the elements populating the bonding wells without leaking. Using an embodiment of this invention, the high wettability adhesive efficiently fills the bonding wells around the elements to be bonded, permitting the bonding wells to be substantially filled without significant overfilling. In this context, overfilling means dispensing adhesive into the bonding wells past the point where the wells are filled sufficiently to wet all the bonding surfaces without excess (significant non-structural quantities of adhesive). Ports between the bonding wells, a use of ramped guiding surfaces, and other features of the fixtures promotes even distribution of the high-wettability adhesive. A curing modality is applied to all of the adhesive in the bonding wells after the bonding surfaces are properly wetted.

Fixture enhancement features integrated into the fixture itself concentrate the curing modality into desired target zones and away from other areas. These features compensate for curing modality distortions that can arise from the source or that are caused by the fixture. For a curing modality that includes UV radiation, the fixture enhancement features are optical elements that focus/lens/direct the UV radiation to desired locations and away from undesired locations.

There may be many different implementations of embodiments of the present invention including permutations of one-part and two-part adhesives with single-stage or multi-stage curing or sealing formulations, with the staging being during dispensing and/or curing. For example, one embodiment includes use of a two-part high-wettability adhesive that "gels" or "skins" upon application of a sealing modality while curing in a more conventional manner. The gelling creates a barrier and seals the apertures preventing leaks and permitting the adhesive to fill the bonding wells and wet the bonding surfaces. In other applications, it is possible to vary the adhesive properties during dispensing such that a first phase adhesive is particularly formulated to enhance the sealing properties by interaction with a curing/sealing modality while a second phase of adhesive being dispensed is particularly formulated to bond the fixture to the elements.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide methods and systems for decreasing costs (expense, mass, and/or cure time) associated with use of adhesives when assembling modularized components by enabling use of high-wettability adhesives. The following description is presented to enable one of ordinary skill in the art to make and use the invention and is provided in the context of a patent application and its requirements. In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Adhesives have been formulated to selectively cure in response to some curing modality, such as ultraviolet (UV) radiation. Selective curing permits control of timing and location of curing. Formulations also exist that permit for use of a secondary curing modality, such as time or temperature. This, combined with high-wettability adhesives formulated to have a low viscosity and/or low surface tension, combined with suitable design of a module fixture, provides a method and apparatus for enabling use of such adhesives for assembling modularized components, such as battery modules that provide lower cost, lower mass, and requires a shorter adhesive working time than conventional systems. Improving upon the efficient and inexpensive formulation of accurate and effective cure zones minimizes adhesive leakage and therefore reduces time and resources in remediating the undesirable effects caused by leaked adhesive.

Figure 1:
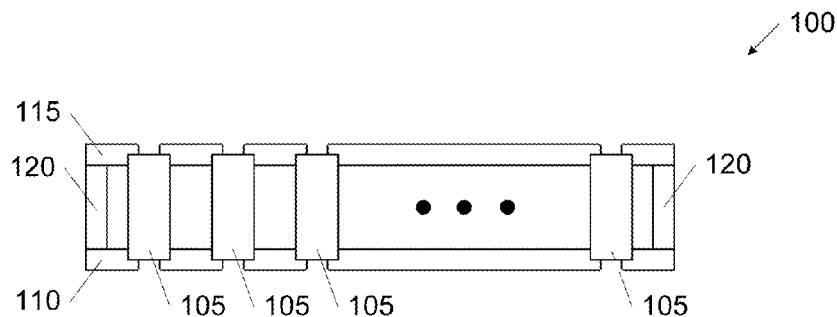
FIG. 1 illustrates a block diagram of a system.

FIG. 1 is a block diagram of a system 100 including a plurality of bonded elements 105 supported by a bonding module fixture. This includes a first module fixture element 110, a second module fixture element 115, and an optional supporting element 120 interconnecting element 110 and element 115 in cases where additional structural support is not otherwise provided. System 100 is lower cost (e.g., lower expense, lower mass, and/or production time (including decreased remediation expense/time)) as compared to conventional systems. While the present invention may be adapted for bonding many different types of elements 105, the invention will be described with reference to formation of a battery cell module made up of a large number (e.g., hundreds to thousands) of battery cells as element 105. Depending upon the implementation and the type of element, one or more first module fixture elements 110 are used to locate, bond, and secure elements 105. For the present example, two module support structures are described, it being understood that fewer or more module support structures may be used. Also in the following description, high-wettability UV reactive adhesives are used. Gravity is effectively used to move uncured and dispensed adhesive, so there is reason to have references of lower and upper when describing the embodiments of the present invention. Such a reference does not necessarily relate to the orientation of intermediate or final products, but only to an orientation during dispensing, wetting, and at least some curing of the adhesives.

The adhesives described herein for use are selectively curable low viscosity and/or low surface tension adhesives. For purposes of the present invention, low viscosity means an adhesive in a range of about 0-2000 centipoise, preferably about 50-1000 centipoise, and most preferably a range of about 100-500 centipoise. For purposes of the present invention, low surface tension means an adhesive, when measuring a contact angle between the adhesive relative to a material of a substrate (e.g., the bonding surface in the bonding well) in air, the contact angle is less than about 30 degrees, preferably less than about 10 degrees, and most preferably less than about 5 degrees.

The adhesives are also selectively curable upon application of a curing modality. The curing modality used in the preferred embodiments includes UV reactive/curing, but other curing modalities may be used, with some adjustment of the systems and methods described herein. These alternate curing modalities may include, for example, application of/exposure to an electron beam, peroxide, cationics, amines, hydroxyl groups, thermal radiation, and combinations thereof. In the context of the present invention, unless otherwise contradicted by the context, selective cure also includes selective "gelling" such that an adhesive may not cure as that term is generally understood, but it may harden/gel sufficiently in a target/seal zone to seal apertures and inhibit exit or flow of adhesive.

Figure 2:
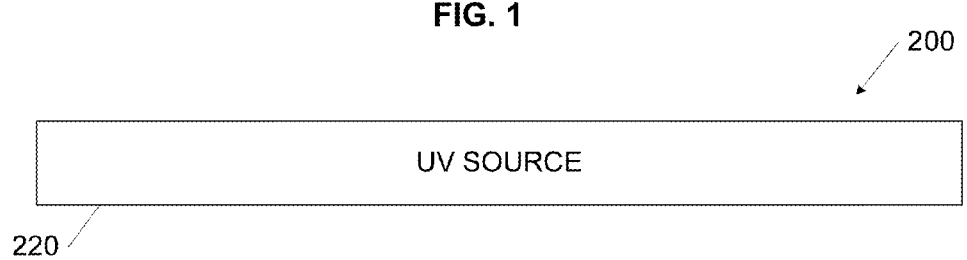
FIG. 2 illustrates a detailed view of a battery cell in a module fixture.
Figure 2:
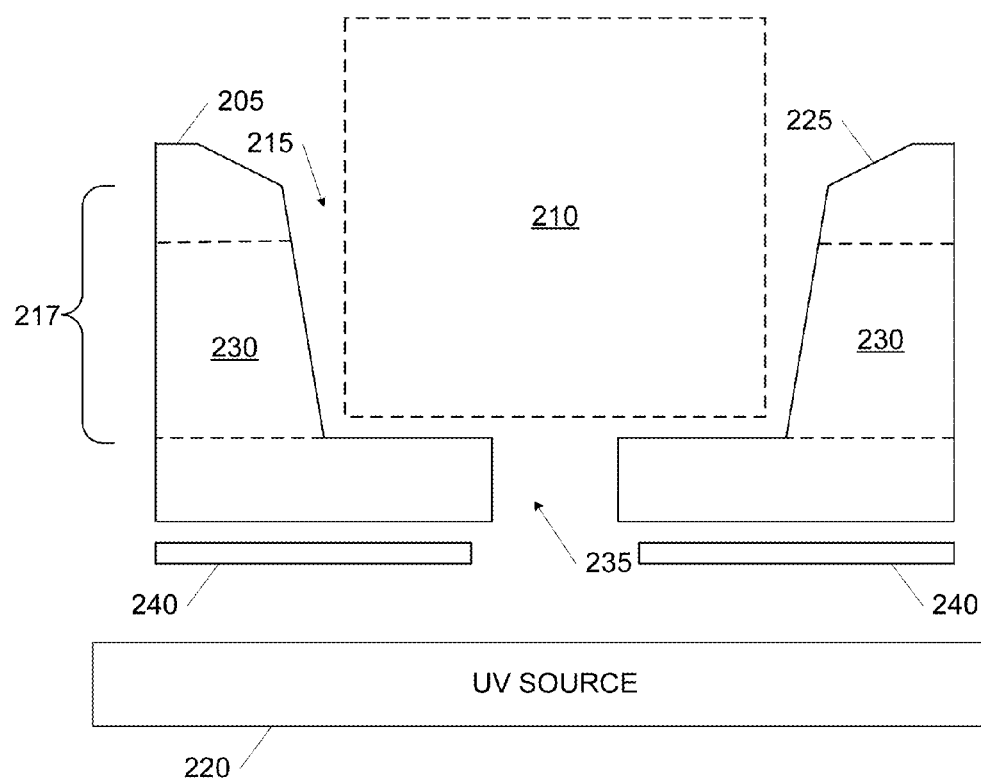

FIG. 2 is a detailed view of a portion 200 of a module fixture 205 supporting a battery cell 210 (not to scale). Module fixture 205 defines a bonding well 215 that receives cell 210, a space between a wall of bonding well 215 and cell 210 being filled with UV reactive, high-wettability adhesive, preferably up to a nominal fill depth 217 without significant overfilling. For purposes of this application, overfilling relates to dispensation of a quantity adhesive in excess of structural purposes. A total amount of dispensed adhesive in a manufacturing environment is subject to normal variations. A goal of the present invention is to reduce remediation expense associated with removing or otherwise ameliorating effects of leaked adhesive curing in and on undesired locations of the module assembly, and related structures. The embodiments of the present invention provide solutions to reducing/eliminating leakage from the bonding wells, but some leakage will be acceptable or desirable in some implementations.

The relative dimensions between walls of module fixture 205 and cell 210 are exaggerated in FIG. 2 and the space is actually much smaller. It is possible to limit the quantity of adhesive in this fashion because of the high-wettability adhesives used in the present invention combined with the selective curing herein described. The detail of FIG. 2 is repeated laterally for each cell 210 to form an entire matrix of battery cells closely packed together.

Dispensed adhesive in bonding well 215 surrounding cell 210 is selectively cured by exposure/application of a curing modality from a source, for example, a UV source 220 (source 220 may be implemented in one or more locations, such as, for example, as shown with a lower UV lamp and an upper UV lamp). Source 220 may also be implemented as a single UV lamp in each location or include several structures, such as for example, a matrix of small sources, with one small source corresponding to each bonding well 215 location. Module fixture 205 is formed with ramps 225 and channels 230 to aid in flowing dispensed adhesive into all bonding wells 215 to wet all bonding surfaces of module fixture 205 and cell 210.

Those regions of the module fixture, particularly around the apertures and bottoms of the bonding wells define a target/seal zone. The exposure of selectively curable adhesive as it enters the target zone to form a barrier against further adhesive exit is one of the features of the present invention that enables use of UV reactive high-wettability adhesive. In some implementations, the target zone is spatially-crafted to form a particular three-dimensional region. For example, when the curing modality includes application of ultraviolet radiation, one or more beams of UV light may be focused, dispersed, or otherwise crafted for desired effect. In a case of using UV LEDs for producing the curing modality into the target zone, some implementations advantageously produce a substantially parallel beam in some cases, a conical beam in other cases, or some other configuration, for parts of the target zone near fixture apertures. Shaping portions of the target zone in this way can offer other advantages for later processing of the module.

The dispensed adhesive, being a UV reactive high-wettability adhesive, will begin to "leak" from areas in a wall of module fixture 205, such as a connection port 235 in bonding well 215 underneath cell 210, such as may be used for an electrical interconnect. As the adhesive begins to emerge, it is cured almost instantly, thereby sealing the aperture against further loss of adhesive and permitting the dispensed adhesive to fill bonding well 215, while also maintaining an ability to make electrical/mechanical contact with cell 210, particularly the anode and cathode. In some cases, a mask 240 may be used to selectively block or transmit the curing modality from desired locations.

Figure 3:
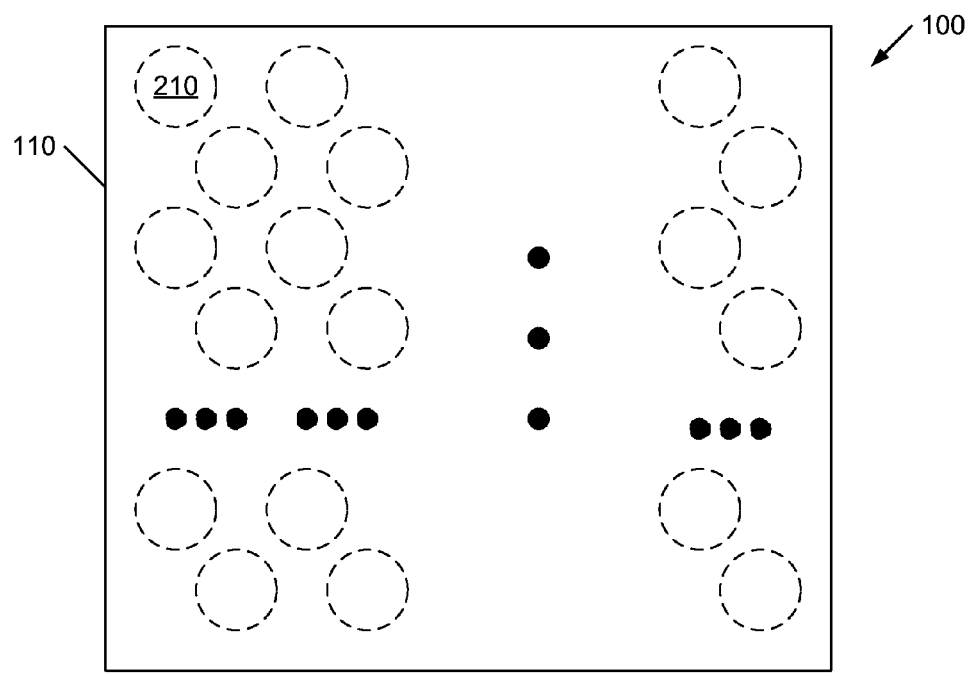
FIG. 3 illustrates an end view of an array of battery cells in a module fixture.

FIG. 3 illustrates an end view of system 100 (e.g., looking "upwards") including an array of battery cells 210 in first module fixture element 110 (also referred to, individually or collectively with second module fixture element 115 as a clamshell) shown in FIG. 1. A goal of the present invention is to prevent adhesive from leaking out of apertures disposed at the end of each battery cell 210 (i.e., inside each dashed line shown in FIG. 3). Selectively curing adhesive as it approaches these apertures prevents these leaks. The incorporated patent references discuss a range of implementation for selective curing of adhesives.

Figure 4:
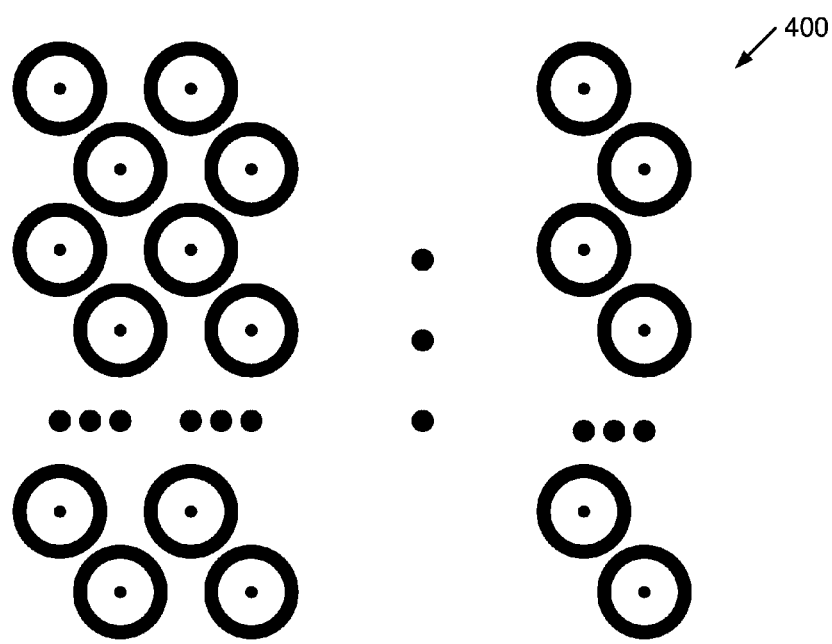
FIG. 4 illustrates an end view of an ideal radiation pattern from the UV source illustrated in FIG. 2.

FIG. 4 illustrates an end view of an ideal radiation pattern 400 from UV source 220 illustrated in FIG. 2 that could be used with the battery cell pattern shown in FIG. 3. The dark bands define the optimal curing modality profile (e.g., UV radiation profile for UV reactive adhesive) centered on each cell 210 and defining the cure zone to be an ordered centered matrix of uniform annuli.

Figure 5:
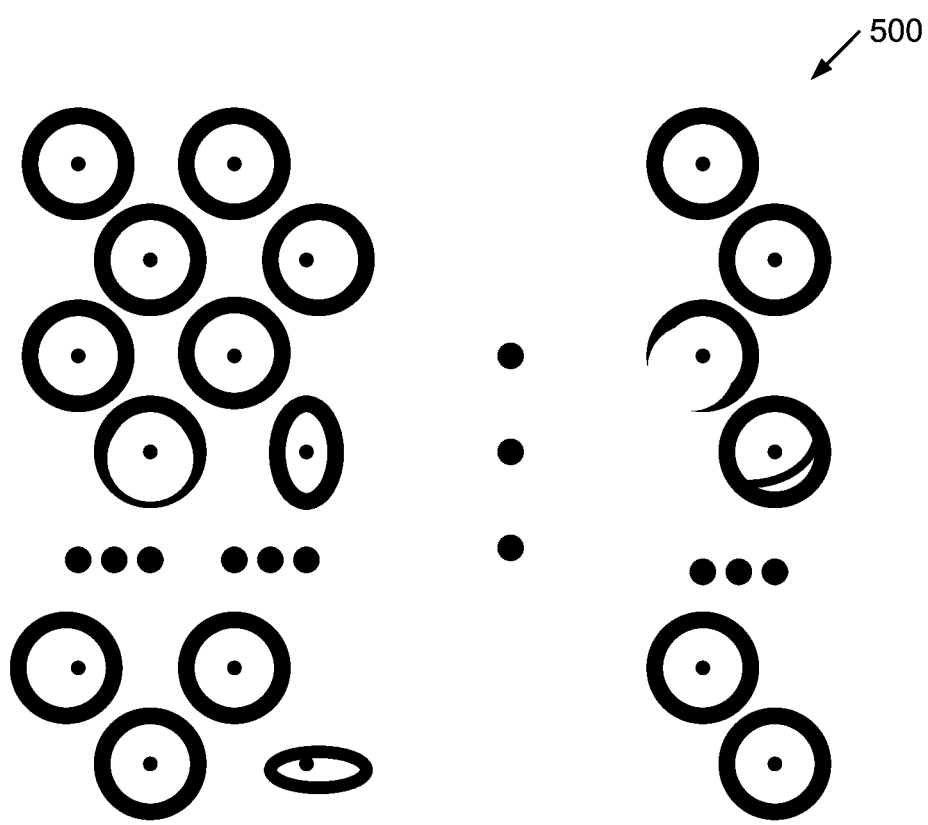
FIG. 5 illustrates an end view of a representative real world radiation pattern from the UV source illustrated in FIG. 2.

FIG. 5 illustrates an end view of a representative real world radiation pattern 500 from the UV source illustrated in FIG. 2. Real world radiation pattern 500 sometimes deviates from ideal radiation pattern 400. There are a host of potential agencies that may contribute to distortions, translations, shadows, reflections, and other undesired radiation maxima or minima. While many curing modality annuli are formed well enough to achieve the desired goal of inhibiting adhesive from flowing out the apertures, just one deviation from the ideal can lead to unobstructed adhesive flow which in turn may cause the adhesive to flow onto other structures and assemblies which often leads to use of resources in remediation. A primary goal of the present invention is to decrease the number and degree of the distortions, conforming real world radiation pattern 500 to ideal radiation pattern 400.

Figure 6:
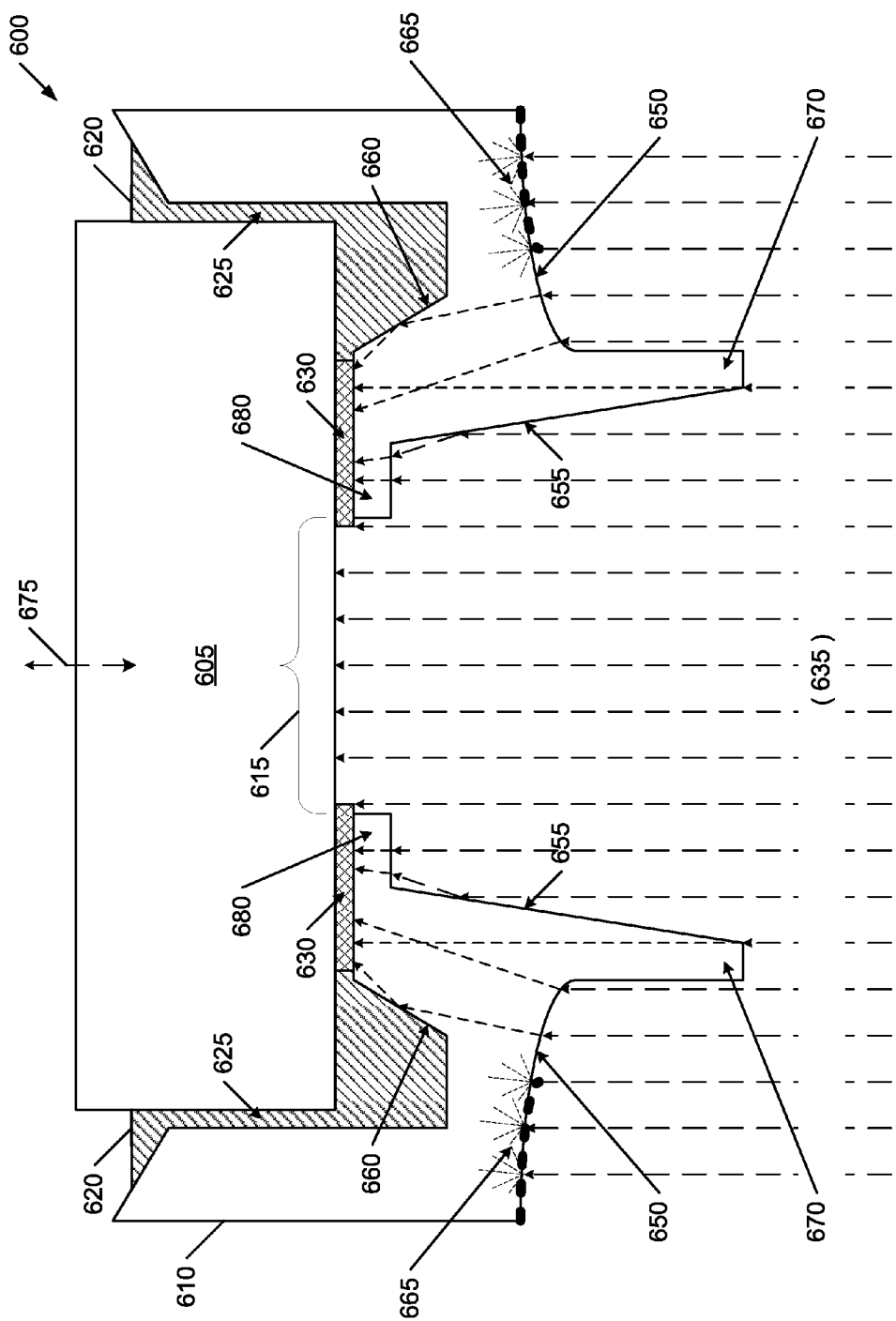
FIG. 6 illustrates a detail of a side view of an optically enhanced selective UV curing system.

FIG. 6 illustrates a detail of a side view of an optically enhanced selective UV curing system 600. A portion of a battery cell 605 is shown disposed in a bore of a multi object (e.g., battery cells) fixture 610 that exposes an aperture 615 for each cell 605. A UV reactive adhesive 620 is disposed in a space 625 between cell 605 and fixture 610, with fixture 610 defining a target zone 630. System 600 creates, for each cell 605, target zone 630 by producing a highest level of UV radiation intensity in that portion of space 625 from a substantially uniform field of incident UV radiation 635. System 600 also produces a lowest level of UV radiation intensity in space 625 outside of target zone 630. Target zone 630 is a region of space 625 where adhesive 620 is to be cured to eliminate continuous adhesive flow through this region while not impairing adhesive flow in other parts of space 625.

Fixture 610 is enhanced with optical features and considerations to effectively create the differential exposure of target zone 630 and other regions of space 625. Embedding these features directly into fixture 610 enables cost-effective self-alignment that produces reliable and reproducible cured annuli in target zone 630 which automatically compensates for distortions and anomalies in the radiation pattern.

In the preferred embodiment for cylindrical battery cells, the illustrated structures discussed and disclosed below exhibit full or partial radial symmetry when looking toward an end of a battery cell along its longitudinal axis. Full radial symmetry includes circular structures while partial radial symmetry includes arcuate structures that are other than complete circles.

System 600 includes an aggregation of representative enhancement features (e.g., optical structures for UV radiation 635) which could be implemented separately and need not necessarily be integrated with all the other features described herein. As noted elsewhere, fixture 610 may hold many cells, each of which is potted and secured. Significant savings are achieved by reducing costs associated with leaking adhesive, which is further magnified by cost-effectively implementing those solutions. A preferred embodiment includes manufacturing fixture 610 using simple plastic molding techniques, and avoiding any post-molding processing of fixture 610.

The fixture material (e.g., the plastic) is transparent to the particular wavelength of ultraviolet radiation used for the UV reactive adhesive. Fixture 610 is provided with one or more optical enhancements used to direct incident UV radiation 635 towards target zone 630 and away from other locations. These optical enhancements are preferably achieved by formation of particular structures or surface treatments of the type that may be achieved consistent with the simple molding process being employed.

These optical enhancements include inclusion and specification of curved surfaces for refractive path definition, strategically located angular surfaces for one or both of external reflection and internal reflection definition, and surface treatment for selective transmission and scattering of UV radiation 635.

Refractive path definition is promoted by placing and shaping one or more curved surfaces 650. Curved surface 650 preferentially bends incident UV radiation toward target zone 630 and away from other parts of space 625.

External reflection definition is promoted by placing and orienting one or more external surfaces 655. External surface 655 reflects incident UV radiation 635 towards target zone 630 and away from other parts of space 625. The external reflections occur due to the incident angle of UV radiation 635 being greater than the angle of total external reflection.

Internal reflection definition is promoted by placing and orienting one or more internal surfaces 660. Internal surface 655 reflects incident UV radiation 635 inside fixture 610 towards target zone 630 and away from other parts of space 625. The internal reflections occur due to the incident angle of UV radiation 635 being greater than the angle of total internal reflection.

Surface treatment includes polished external surfaces (default) for high transmission and roughened external surfaces 665 designed to scatter/attenuate incident UV radiation 635 to promote greater intensity of UV radiation 635 in target zone 630 while diminishing the intensity of UV radiation 635 in other parts of space 625. Polishing and roughening are features that are, in the preferred embodiment, sufficiently controlled by designing the mold to produce these effects. However, some embodiments may implement other/additional techniques to finely polish or particularly roughen the relevant surfaces. Surfaces of fixture 610 are considered polished absent expressly identifying them as roughened external surface 665. The polished surfaces maximally and predictably transmit, reflect, and refract UV radiation 635.

The optical enhancements may, like in the preferred embodiment, also include particular structures used to enhance concentration of UV radiation 635 into target zone 630. These structures include a relatively tall lateral wall 670 (which also serves to help protect electrical contact to cell 605) with an incorporated properly sloped externally reflective surface 655 disposed "outboard" (relative to a longitudinal axis 675 of cell 605) of a shelf 680. Shelf 680 is a relatively long, flat, and wide area overlying target zone 630 that helps promote better concentration of UV radiation 635 into target zone 630.

It should be noted that almost any surface of a transparent fixture could, in response to a single particularly directed ray of UV radiation, perform in isolation similar to an optical enhancement structure as it could refract, reflect, and/or transmit that ray to the target zone and away from other parts of the adhesive. However, the structures and features of the preferred embodiment perform in the disclosed fashion when exposed to a substantially uniform radiation field to collectively concentrate the radiation in the target zones and away from non-target zones. In this context, substantially uniform refers to a UV radiation field that exposes the entire fixture, or a portion thereof proximate each bore, to a collection of parallel (or uniformly slightly converging or diverging) rays.

To be clear, it is appreciated that the disclosure herein contemplates at least two phases of curing. There is a first phase in which dispensing adhesive is selectively cured in strategic locations to prevent/inhibit leakage of the dispensing adhesive until a sufficient quantity of adhesive is dispensed into the appropriate locations. Then there is a subsequent second phase of curing which is typically more generalized, but may be selective as well, to sufficiently cure desired portions of adhesive after it has been dispensed. The optical enhancement features and structures are, in the preferred implementations, principally directed to improving the first phase of selective curing.

The system above has been described in the preferred embodiment of multicell battery module used in electric vehicle (EV) systems. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A method for bonding a battery and a fixture, where the fixture has a bonding well defined by a wall of the bonding well and a bottom of the bonding well, and an optical enhancement structure defined by a one or more of an internal surface defined in the bottom of the bonding well, an external surface opposite the bonding well, and a curved surface opposite the bonding well, wherein the fixture defines an aperture in the bottom of the bonding well, wherein a space exists between the wall of the bonding well and the battery, and between the bottom of the bonding well and the battery, and wherein a portion of the bottom of the bonding well defines a target zone, the method comprising:
dispensing an adhesive into the space between the wall of the bonding well and the battery and between, the bottom of the bonding well and the battery;
exposing the fixture to a curing modality from a source; and
concentrating the curing modality into the target zone using the optical enhancement structure.

2. The method of claim 1, wherein the target zone is adjacent the aperture.

3. The method of claim 1, wherein the fixture includes a shelf, wherein the bottom of the bonding well is partly defined by the shelf and wherein the internal surface extends from the shelf and away from the battery and the aperture.

4. The method of claim 1, wherein the fixture includes a shelf and a lateral wall, wherein the external surface extends from the shelf to the lateral wall, and away from the battery and the aperture.

5. The method of claim 1, wherein the fixture includes a lateral wall, and wherein the curved surface extends from the lateral wall, towards the battery and away from the aperture.

6. The method of claim 1, wherein the optical enhancement structure includes the internal surface, the external surface, and the curved surface.

7. The method of claim 1, wherein the curing modality includes ultraviolet radiation.

8. The method of claim 7, wherein the source is a ultraviolet source.

9. The method of claim 1, wherein the internal surface is polished.

10. The method of claim 1, wherein the external surface is polished.

11. The method of claim 1, wherein a portion of the curved surface is roughened.

12. The method of claim 11, wherein another portion of the curved surface is polished.

* * * * *